United States Patent [19]

Aoki

[11] Patent Number: 5,424,782
[45] Date of Patent: Jun. 13, 1995

[54] STILL PICTURE SIGNAL/MOTION PICTURE SIGNAL MIXING CIRCUIT

[75] Inventor: Masayuki Aoki, Tokyo, Japan

[73] Assignee: NEC Corporation, Tokyo, Japan

[21] Appl. No.: 183,488

[22] Filed: Jan. 19, 1994

[30] Foreign Application Priority Data

Jan. 20, 1993 [JP] Japan .................. 5-007119

[51] Int. Cl.⁶ .......................................... H04N 9/76
[52] U.S. Cl. ........................... 348/598; 348/588
[58] Field of Search ............ 348/584, 586, 588, 598, 348/599, 239; H04N 9/76

[56] References Cited

U.S. PATENT DOCUMENTS

| | | | |
|---|---|---|---|
| 5,008,754 | 4/1991 | Trevett et al. | 348/599 |
| 5,027,213 | 6/1991 | Kamin | 348/598 |
| 5,231,498 | 7/1993 | Kawamoto | 348/588 |
| 5,333,055 | 7/1994 | Murata et al. | 348/239 |

FOREIGN PATENT DOCUMENTS 3612934 10/1987 Germany .................. H04N 9/76

Primary Examiner—James J. Groody
Assistant Examiner—Jeffrey S. Murrell

[57] ABSTRACT

Disclosed is a mixing circuit. A still-picture signal (S) input from a still-picture signal input terminal and a motion-picture signal (M) input from a motion-picture signal input terminal are added together by a first adder, and the resultant signal is converted to (S+M)/2 by a first 1-bit right shifter, and to (S+M)/4 by a 2-bit right shifter. One of the outputs of those shifters is selected by a first multiplexer in accordance with shift signals CI2--CI0. The still-picture signal (S) and motion-picture signal (M) are also respectively converted by a second 1-bit right shifter and a third 1-bit right shifter to S/2 and M/2, one of which or "O" is selected by a second multiplexer in accordance with the shift signals CI2--CI0. The outputs of the first and second multiplexers are added together by a second adder to be input to a third multiplexer. The output of the third multiplexer is determined by the shift signals CI2-CI0, and is output from an output terminal.

12 Claims, 4 Drawing Sheets

STILL PICTURE SIGNAL/MOTION PICTURE SIGNAL MIXING CIRCUIT

BACKGROUND OF THE INVENTION

1. Field of the Invention

The present invention relates to a mixing circuit, and, more particularly, to a still-picture signal/motion-picture signal mixing circuit in a color signal processor or a luminance signal processor.

2. Description of the Prior Art

FIG. 1 shows a conventional mixing circuit for MUSE(multiple sub-nyquist sampling encoding) in a color signal processor. As shown in FIG. 1, the conventional mixing circuit has a still-picture signal input terminal 51, a 1-bit right shifter 52, a 2-bit right shifter 53, an adder 54, a 1-bit right shifter 55, a 2-bit right shifter 56, a multiplexer 57, a motion-picture signal input terminal 58, a 1-bit right shifter 59, a 2-bit right shifter 60, an adder 61, a 1-bit right shifter 62, a 2-bit right shifter 63, a multiplexer 64, an adder 65, and an output terminal 66.

The function of this mixing circuit will now be described. A still-picture signal (S) input from the still-picture signal input terminal 51 is divided to S/2 by the 1-bit right shifter 55, to S/4 by the 2-bit right shifter 56, and to 3S/4 by the 1-bit right shifter 52, 2-bit right shifter 53 and adder 54. The multiplexer 57 selects one of those signals S, S/2, S/4 and 3S/4 in accordance with shift signals CI2 to CI0.

A motion-picture signal (M) input from the motion-picture signal input terminal 58 is divided to M/2 by the 1-bit right shifter 62, to M/4 by the 2-bit right shifter 63, and to 3M/4 by the 1-bit right shifter 59, 2-bit right shifter 60 and adder 61. The multiplexer 64 selects one of those signals M, M/2, M/4 and 3M/4 in accordance with shift signals CI2 to CI0.

The still-picture signal and motion-picture signal respectively selected by the multiplexers 57 and 64 are added together by the adder 65, and the resultant signal is output from the output terminal 66. The outputs of the multiplexers 57, 64 and the adder 65 in accordance with each combination of the shift signals CI2–CI0 are given in Table 1. This Table 1 shows the relationship between the input patterns of the shift signals CI2–CI0 and those outputs in FIG. 1.

A conventional mixing circuit for MUSE in a luminance signal processor, as shown in FIG. 2, has a still-picture signal input terminal 71, a motion-picture signal input terminal 72, a subtracter 73, a 1-bit right shifter 74, a 2-bit right shifter 75, a 3-bit right shifter 76, a 4-bit right shifter 77, AND gates 78, 79, 80 and 81, adders 82 and 83, a switch 84, adders 85 and 86, a shift-signal input terminal 87 and an output terminal 88.

The function of this mixing circuit will be described below. A still-picture signal (S) input from the still-picture signal input terminal 71 is subtracted from a motion-picture signal (M) input from the motion-picture signal input terminal 72 by the subtracter 73. The output (M-S) of this subtracter 73 is converted to (M-S)/2 by the 1-bit right shifter 74, (M-S)/4 by the 2-bit right shifter 75, (M-S)/8 by the 3-bit right shifter 76, and (M-S)/16 by the 4-bit right shifter 77. The outputs of those shifters 74 to 77 are allowed to pass the respective AND gates 78 to 81 in accordance with the combination of shift signals KI3KI0 input from the shift-signal input terminal 87. The outputs of those AND gates 78 to 81 are put through the associated adders 82, 83, 85 and 86, and the resultant signal is output from the output terminal 88. It is to be noted that when the shift signals KI3-KI0 are all "1", the switch 84 selects the other input that the one coming from the adder 82 (and selects the input from the adder 82 otherwise), and the outputs of the AND gates 78 to 81 are all "0."

The outputs of the subtracter 73 and the adders 82, 83, 85 and 86 in accordance with each combination of the shift signals KI3–KI0 are given in Table 2. This Table 2 shows the relationship between the input patterns of the shift signals KI3–KI0 and those outputs in FIG. 2.

The conventional mixing circuits for MUSE disadvantageously contain many adders which have a large circuit size.

TABLE 1

| CI2 | CI1 | CI0 | OUTPUT OF MULTIPLEXER 57 | OUTPUT OF MULTIPLEXER 64 | OUTPUT OF ADDER 65 |
|---|---|---|---|---|---|
| 0 | 0 | 0 | S | 0 | S |
| 0 | 0 | 1 | 3S/4 | M/4 | 3S/4 + M/4 |
| 0 | 1 | 0 | S/2 | M/2 | S/2 + M/2 |
| 0 | 1 | 1 | S/4 | 3M/4 | S/4 + 3M/4 |
| 1 | 0 | 0 | 0 | M | M |

TABLE 2

| KI3 | KI2 | KI1 | KI0 | OUTPUT OF SUBTRACTER 73 | OUTPUT OF ADDER 82 | OUTPUT OF ADDER 83 | OUTPUT OF ADDER 85 | OUTPUT OF ADDER 86 |
|---|---|---|---|---|---|---|---|---|
| 0 | 0 | 0 | 0 | M − S | 0 | 0 | 0 | S |
| 0 | 0 | 0 | 1 | M − S | 0 | (M − S)/16 | (M − S)/16 | 15S/16 + M/16 |
| 0 | 0 | 1 | 0 | M − S | 0 | (M − S)/8 | 2(M − S)/16 | 14S/16 + 2M/16 |
| 0 | 0 | 1 | 1 | M − S | 0 | 3(M − S)/16 | 3(M − S)/16 | 13S/16 + 3M/16 |
| 0 | 1 | 0 | 0 | M − S | (M − S)/4 | 0 | 4(M − S)/16 | 12S/16 + 4M/16 |
| 0 | 1 | 0 | 1 | M − S | (M − S)/4 | (M − S)/16 | 5(M − S)/16 | 11S/16 + 5M/16 |
| 0 | 1 | 1 | 0 | M − S | (M − S)/4 | (M − S)/8 | 6(M − S)/16 | 10S/16 + 6M/16 |
| 0 | 1 | 1 | 1 | M − S | (M − S)/4 | 3(M − S)/16 | 7(M − S)/16 | 9S/16 + 7M/16 |
| 1 | 0 | 0 | 0 | M − S | (M − S)/2 | (M − S)/16 | 9(M − S)/16 | 7S/16 + 9M/16 |
| 1 | 0 | 0 | 1 | M − S | (M − S)/2 | (M − S)/8 | 10(M − S)/16 | 6S/16 + 10M/16 |
| 1 | 0 | 1 | 0 | M − S | (M − S)/2 | 3(M − S)/16 | 11(M − S)/16 | 5S/16 + 11M/16 |
| 1 | 0 | 1 | 1 | M − S | 3(M − S)/4 | 0 | 12(M − S)/16 | 4S/16 + 12M/16 |
| 1 | 1 | 0 | 0 | M − S | 3(M − S)/4 | (M − S)/16 | 13(M − S)/16 | 3S/16 + 13M/16 |
| 1 | 1 | 0 | 1 | M − S | 3(M − S)/4 | (M − S)/8 | 14(M − S)/16 | 2S/16 + 14M/16 |
| 1 | 1 | 1 | 0 | M − S | 3(M − S)/4 | 3(M − S)/16 | 15(M − S)/16 | S/16 + 15M/16 |
| 1 | 1 | 1 | 1 | M − S | 0 | 0 | M − S | M |

SUMMARY OF THE INVENTION

It is therefore an object of the present invention to provide a mixing circuit which can reduce the number of adders in the mixing circuit, thereby reducing the circuit scale.

To achieve this object, a mixing circuit according to the present invention comprises a first adder for adding received first and second input signals; a first group of M bit-shifters for multiplying an output of said first adder by $1/(2N)$, $1/(2^2N)$, ... and $1/(2^MN)$ (where M and N are natural numerals); a first multiplexer for selecting one of outputs of said first group of M bit-shifters in accordance with a shift signal; a second to R-th groups of bit-shifters, P-th ($2 \leq P \leq R$) group of which has two bit-shifters for multiplying said first input signal and said second input signal by $\frac{1}{2}^{P-1}$ (where R and P are natural numerals: $R \geq 2$); a second to R-th multiplexers, P-th multiplexer of which selects one of outputs of P-th group of bit-shifters which provides $\frac{1}{2}^{P-1}$ of said first input signal and $\frac{1}{2}^{P-1}$ of said second input signal, or "0" in accordance with said shift signal; a second to R-th adders for adding outputs of said first to R-th multiplexers; and a (R+1)-th multiplexer for selecting one of an output of a last one of said second to R-th adders, said first input signal and said second input signal in accordance with said shift signal.

This structure permits the number of adders in use to be reduced.

The present invention is not limited to the use for MUSE, but is also applicable to a mixing circuit for another signal processor, such as a video signal processor.

DETAILED DESCRIPTION OF THE PREFERRED EMBODIMENTS

Figure 1:
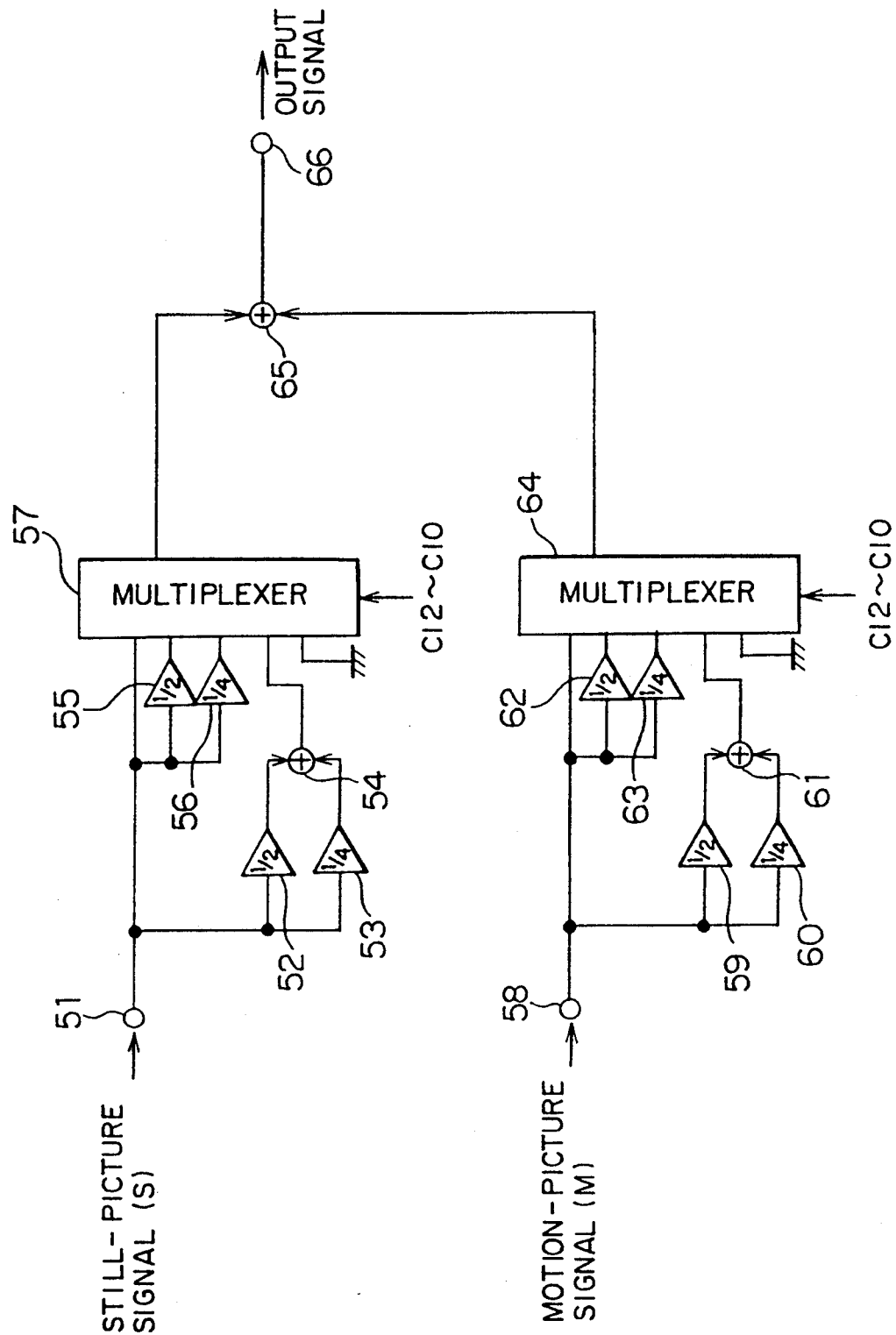
FIG. 1 is a block diagram showing prior art of a color signal mixing circuit.
Figure 2:
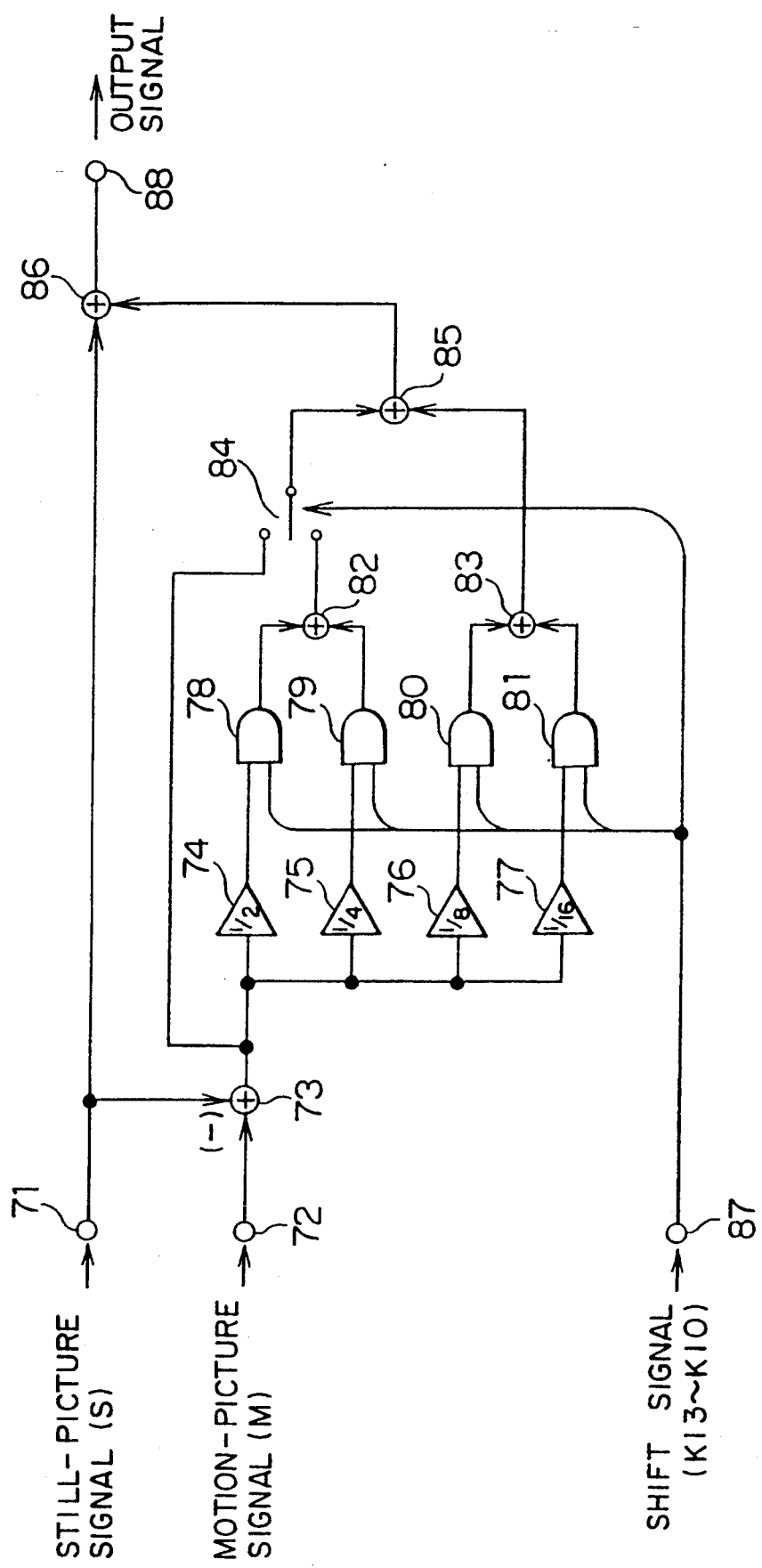
FIG. 2 is a block diagram showing another prior art of a luminance signal mixing circuit.
Figure 3:
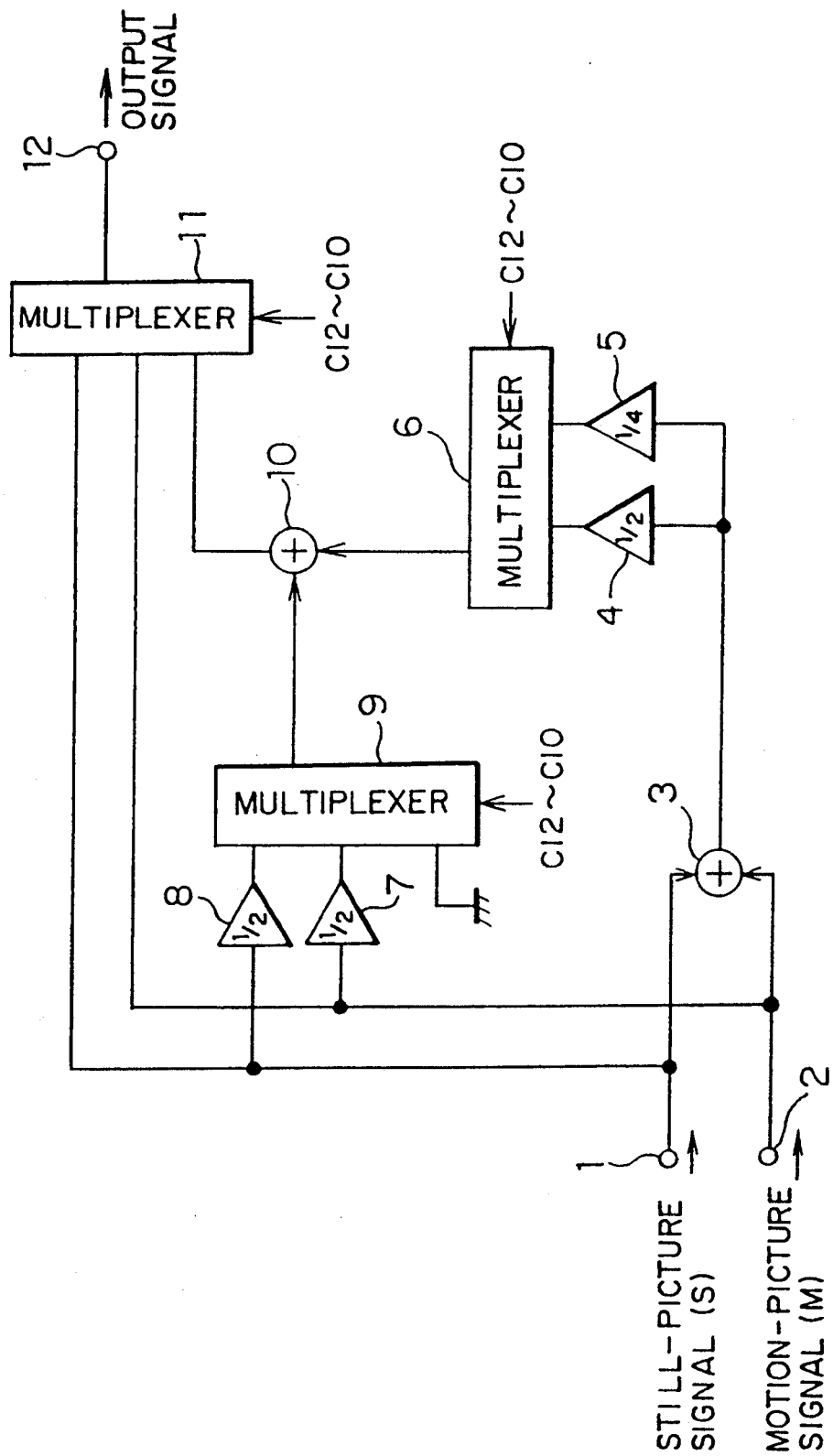
FIG. 3 is a block diagram showing one embodiment of the present invention.

FIG. 3 presents a block diagram showing an embodiment of the present invention as adapted to a still-picture signal/motion-picture signal mixing circuit for a color signal processor.

As shown in FIG. 3, this mixing circuit for MUSE has a still-picture signal input terminal 1, a motion-picture signal input terminal 2, an adder 3, a 1-bit right shifter 4, a 2-bit right shifter 5, a multiplexer 6, a 1-bit right shifters 7 and 8, a multiplexer 9, an adder 10, a multiplexer 11 and an output terminal 12.

The function of this mixing circuit will be described below. A still-picture signal (S) input from the still-picture signal input terminal 1 and a motion-picture signal (M) input from the motion-picture signal input terminal 2 are added together by the adder 3, and the resultant signal is converted to $(S+M)/2$ by the 1-bit right shifter 4, and to $(S+M)/4$ by the 2-bit right shifter 5. One of the outputs of the shifters 4 and 5 is selected by the multiplexer 6 in accordance with shift signals CI2–CI0. The still-picture signal (S) and motion-picture signal (M) are also respectively converted by the 1-bit right shifters 8 and 7 to S/2 and M/2, one of which or "0" is selected by the multiplexer 9 in accordance with the shift signals CI2–CI0. The outputs of the multiplexers 6 and 9 are added together by the adder 10 to be an input to the multiplexer 11. The output of the multiplexer 11 is determined by the shift signals CI2–CI0, and is output from the output terminal 12. The outputs of the multiplexers 6, 9 and 11 and the adder 10 in accordance with each combination of the shift signals CI2–CI0 are given in Table 3. Table 3 shows the relationship between the input patterns of the shift signals CI2–CI$_0$ and those outputs in FIG. 3.

According to this embodiment, the selected one of the signals $(\frac{3}{4})S+(\frac{1}{4})M$, $(\frac{1}{2})S+(\frac{1}{2})M$ and $(\frac{1}{4})S+(\frac{3}{4})M$, the signal S or the signal M is selected by the multiplexer 11 in accordance with the shift signals CI2–CI0, and the finally selected signal is output from the output terminal 12. It is therefore possible to reduce the number of adders in the mixing circuit which selectively mixes color signals, undergone still-picture signal processing and motion-picture signal processing, in 5 ways and outputs the resultant signal, thereby contributing to reducing the circuit scale.

Another embodiment of this invention will now be described.

Figure 4:
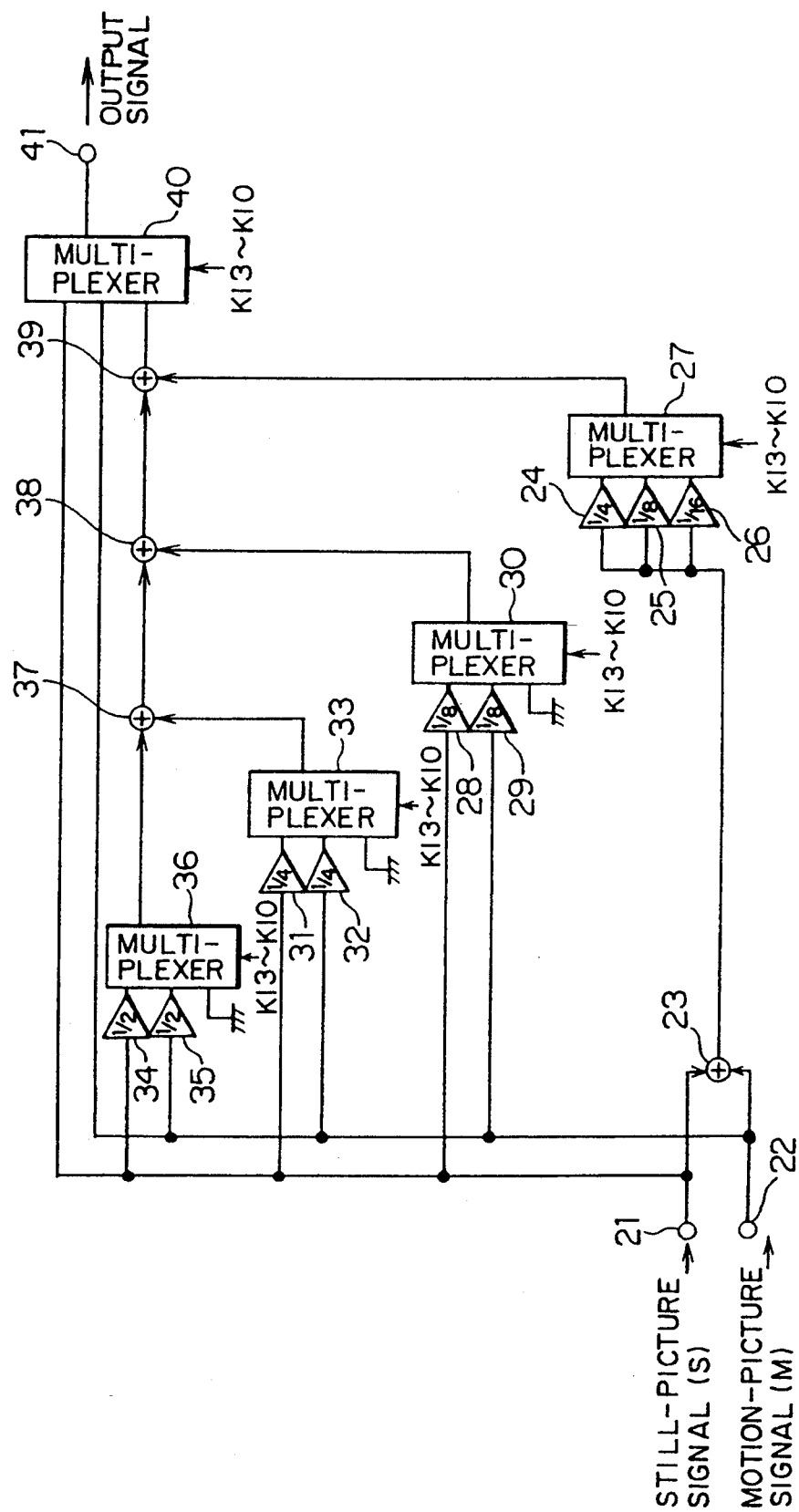
FIG. 4 is a block diagram showing another embodiment of this invention.

FIG. 4 presents a block diagram showing a mixing circuit for MUSE according to an embodiment of this invention as adapted to a still-picture signal/motion-picture signal mixing circuit for a luminance signal processor. The mixing circuit for MUSE shown in FIG. 4 has a still-picture signal input terminal 21, a motion-picture signal input terminal 22, an adder 23, a 2-bit right shifter 24, a 3-bit right shifter 25, a 4-bit right shifter 26, a multiplexer 27, 3-bit right shifters 28 and 29, a multiplexer 30, 2-bit right shifters 31 and 32, a multiplexer 33, 1-bit right shifters 34 and 35, a multiplexer 36, adders 37, 38, 39, a multiplexer 40 and an output terminal 41.

The function of this mixing circuit will be described below. A still-picture signal (S) input from the still-picture signal input terminal 21 and a motion-picture signal (M) input from the motion-picture signal input terminal 22 are added together by the adder 23, and the resultant signal is converted to $(S+M)/4$ by the shifter 24, to $(S+M)/8$ by the shifter 25, and to $(S+M)/16$ by the shifter 26. One of the outputs of the shifters 24, 25 and 6 is selected by the multiplexer 27 in accordance with shift signals KI3–KI0. The still-picture signal (S) and motion-picture signal (M) are also respectively converted by the shifters 34 and 35 to S/2 and M/2, one of which or "0" is selected by the multiplexer 36 in accordance with the shift signals KI3–KI0. Likewise, the still-picture signal (S) and motion-picture signal (M) are respectively converted by the shifters 31 and 32 to S/4 and M/4, one of which or "0" is selected by the multiplexer 33 in accordance with the shift signals KI3–KI0, while the still-picture signal (S) and motion-picture signal (M) are respectively converted by the shifters 28 and 29 to S/8 and M/8, one of which or "0" is selected by the multiplexer 30 in accordance with the shift signals KI3–KI0. The outputs of the multiplexers 36, 33, 30 and 27 are added together by the adders 37, 38 and 39 to be an input to the multiplexer 40. The output of the multiplexer 40 is determined by the shift signals KI3–KI0, and is output from the output terminal 41. The outputs of the multiplexer 36, 33, 30, 27 and 40 in accordance with each combination of the shift signals KI3–KI0 are given in Table 4. This Table 4 shows the relationship between the input patterns of the shift signals KI3–KI0 and those outputs in FIG. 4.

Since the mixing circuit for processing the luminance signal does not involve an output $(S/2)+(M/2)$, the multiplexer 27 does not need an input of $(S+M)/2$.

According to this embodiment, the selected one of the signals $(15/16)S+(1/16)M$, $(14/16)S+(2/16)M$, $(13/16)S+(3/16)M$, $(12/16)S+(4/16)M$, (11/16)S+(5/16)M, (10/16)S+(6/16)M, (9/16)S+(7/16)M, (7/16)S+(9/16)M, (6/16)S+(10/16)M, (5/16)S+(11/16)M, (4/16)S+(12/16)M, (3/16)S+(13/16)M, (2/16)S+(14/16)M and (1/16)S+(15/16)M, the signal S or the signal M is selected by the multiplexer 40 in accordance with the shift signals KI3–KI0, and the finally selected signal is output from the output terminal 41. It is therefore possible to reduce the number of adders in the mixing circuit which selectively mixes luminance signals, undergone still-picture signal processing and motion-picture signal processing, in 16 ways and outputs the resultant signal, thereby contributing to reducing the circuit scale.

Although only two embodiments of the present invention have been described herein, it should be apparent to those skilled in the art that the present invention may be embodied in many other specific forms without departing from the spirit or scope of the invention. For instance, this invention is also applicable to a mixing circuit for a signal processor other than those which process a still-picture signal and a motion-picture signal.

TABLE 3

| CI 2 | CI 1 | CI 0 | OUTPUT OF MULTIPLEXER 6 | OUTPUT OF MULTIPLEXER 9 | OUTPUT OF ADDER 10 | OUTPUT OF MULTIPLEXER 11 |
|---|---|---|---|---|---|---|
| 0 | 0 | 0 | X | 0 | X | S |
| 0 | 0 | 1 | S/4 + M/4 | S/2 | 3S/4 + M/4 | 3S/4 + M/4 |
| 0 | 1 | 0 | S/2 + M/2 | 0 | S/2 + M/2 | S/2 + M/2 |
| 0 | 1 | 1 | S/4 + M/4 | M/2 | S/4 + 3M/4 | S/4 + 3M/4 |
| 1 | 0 | 0 | X | 0 | X | M |

TABLE 4

| KI 3 | KI 2 | KI 1 | KI 0 | OUTPUT OF MULTIPLEXER 36 | OUTPUT OF MULTIPLEXER 33 | OUTPUT OF MULTIPLEXER 30 | OUTPUT OF MULTIPLEXER 37 | OUTPUT OF MULTIPLEXER 40 |
|---|---|---|---|---|---|---|---|---|
| 0 | 0 | 0 | 0 | 0 | 0 | 0 | X | S |
| 0 | 0 | 0 | 1 | S/2 | S/4 | S/8 | S/16 + M/6 | 15S/16 + M/16 |
| 0 | 0 | 1 | 0 | S/2 | S/4 | 0 | S/8 + M/8 | 14S/16 + 2M/16 |
| 0 | 0 | 1 | 1 | S/2 | S/4 | M/8 | S/16 + M/16 | 13S/16 + 3M/16 |
| 0 | 1 | 0 | 0 | S/2 | 0 | 0 | S/4 + M/4 | 12S/16 + 4M/16 |
| 0 | 1 | 0 | 1 | S/2 | M/4 | S/8 | S/16 + M/16 | 11S/16 + 5M/16 |
| 0 | 1 | 1 | 0 | S/2 | M/4 | 0 | S/8 + M/8 | 10S/16 + 6M/16 |
| 0 | 1 | 1 | 1 | S/2 | M/4 | M/8 | S/16 + M/16 | 9S/16 + 7M/16 |
| 1 | 0 | 0 | 0 | M/S | S/4 | S/8 | S/16 + M/16 | 7S/16 + 9M/16 |
| 1 | 0 | 0 | 1 | M/S | S/4 | 0 | S/8 + M/8 | 6S/16 + 10M/16 |
| 1 | 0 | 1 | 0 | M/S | S/4 | M/8 | S/16 + M/16 | 5S/16 + 11M/16 |
| 1 | 0 | 1 | 1 | M/S | 0 | 0 | S/4 + M/4 | 4S/16 + 12M/16 |
| 1 | 1 | 0 | 0 | M/S | M/4 | S/8 | S/16 + M/16 | 3S/16 + 13M/16 |
| 1 | 1 | 0 | 1 | M/S | M/4 | 0 | S/8 + M/8 | 2S/16 + 14M/16 |
| 1 | 1 | 1 | 0 | M/S | M/4 | M/8 | S/16 + M/16 | S/16 + 15M/16 |
| 1 | 1 | 1 | 1 | 0 | 0 | 0 | X | M |

What is claimed is:

1. A mixing circuit for mixing signals, comprising:
   a first input means for supplying a first input signal;
   a second input means for supplying a second input signal;
   a first adder, coupled to said first and second input means, for adding said first and second input signals received from said first and second input means and outputting an output signal;
   a first group of M parallel bit-shifters for multiplying said output signal of said first adder by $1/(2N)$, $1/(2^2N)$, ... and $1/(2^M N)$ (where M and N are natural numerals);
   a first multiplexer for selecting one of outputs of said first group of M parallel bit-shifters in accordance with a shift signal;
   a second to R-th groups of bit-shifters, P-th ($2 \leq P \leq R$) group of which has two parallel bit-shifters, coupled to said first and second input means respectively for receiving and multiplying said first input signal and said second input signal by $\frac{1}{2}^{P-1}$, respectively (where R and P are natural numerals: $R \geq 2$);
   a second to R-th multiplexers, P-th multiplexer of which selects one of outputs of said P-th group of parallel bit-shifters which provides $\frac{1}{2}^{P-1}$ of said first input signal and $\frac{1}{2}^{P-1}$ of said second input signal, or "0" in accordance with said shift signal;
   a second to R-th adders, coupled to said first to R-th multiplexers, for adding outputs of said first to R-th multiplexers; and
   a (R+1)-th multiplexer for receiving and selecting one of an output of a last one of said second to R-th adders, said first input signal and said second input signal in accordance with said shift signal.

2. The mixing circuit according to claim 1;
   wherein said first signal is a still-picture signal and said second signal is a motion-picture signal.

3. The mixing circuit according to claim 1;
   wherein said mixing circuit is used in a color signal processor.

4. The mixing circuit according to claim 1;
   wherein said mixing circuit is used in a luminance signal processor.

5. A mixing circuit for mixing signals, comprising:
   a first input means for supplying a first input signal;
   a second input means for supplying a second input signal;
   a first adder, coupled to said first and second input means, for adding said first and second input signals received from said first and second input means and outputting an output signal;
   a first group of two parallel bit-shifters for multiplying said output signal of said first adder by $\frac{1}{2}$, $\frac{1}{2}^2$;
   a first multiplexer for selecting one of outputs of said first group of two parallel bit-shifters in accordance with a shift signal;

a second group of two parallel bit-shifters, for receiving and multiplying said first input signal and said second input signal by ½;

a second multiplexer for selecting one of outputs of said second group of parallel bit-shifters which provides ½ of said first input signal and ½ of said second input signal, or "0" in accordance with said shift signal;

a second adder, coupled to said first and second multiplexers, for adding outputs of said first and second multiplexers; and a third multiplexer for receiving and selecting one of an output of said first input signal and said second input signal in accordance with said shift signal.

6. The mixing circuit according to claim 5;
wherein said first signal is a still-picture signal and said second signal is a motion-picture signal.

7. The mixing circuit according to claim 5;
wherein said mixing circuit is used in a color signal processor.

8. The mixing circuit according to claim 5;
wherein said mixing circuit is used in a luminance signal processor.

9. A mixing circuit for mixing signals, comprising:
a first input means for supplying a first input signal;
a second input means for supplying a second input signal;
a first adder, coupled to said first and second input means, for adding said first and second input signals received from said first and second input means and outputting an output signal;

a first group of three parallel bit-shifters for multiplying said output signal of said first adder by ¼, ⅛ and 1/16;

a first multiplexer for selecting one of outputs of said first group of three parallel bit-shifters in accordance with a shift signal;

a second to fourth groups of bit-shifters, P-th ($2 \leq P \leq 4$) group of which has two parallel bit-shifters, coupled to said first and second terminals, respectively, for receiving and multiplying said first input signal and said second input signal by $\frac{1}{2}^{P-1}$, respectively (where P is natural numeral);

a second to fourth multiplexers, P-th multiplexer of which selects one of outputs of P-th group of bit-shifters which provides $\frac{1}{2}^{P-1}$ of said first input signal and $\frac{1}{2}^{P-1}$ of said second input signal, or "0" in accordance with said shift signal;

a second to fourth adders, coupled to said first to fourth multiplexers, for adding outputs of said first to fourth multiplexers; and a fifth multiplexer for receiving and selecting one of an output of a last one of said second to fourth adders, said first input signal and said second input signal in accordance with said shift signal.

10. The mixing circuit according to claim 9;
wherein said first signal is a still-picture signal and said second signal is a motion-picture signal.

11. The mixing circuit according to claim 9;
wherein said mixing circuit is used in a color signal processor.

12. The mixing circuit according to claim 9;
wherein said mixing circuit is used in a luminance signal processor.

* * * * *